(12) United States Patent
Colquhoun et al.

(10) Patent No.: US 11,418,529 B2
(45) Date of Patent: Aug. 16, 2022

(54) DETECTION OF VULNERABILITIES IN A COMPUTER NETWORK

(71) Applicant: Palantir Technologies Inc., Palo Alto, CA (US)

(72) Inventors: Elliot Colquhoun, Sydney (AU);
Abhishek Agarwal, Jaipur (IN);
Andrew Eggleton, Doha (QA);
Brandon Helms, Arnold, MD (US);
Carl Ambroselli, Potsdam (DE); Cem Zorlular, New York, NY (US); Daniel Kelly, New York, NY (US); Gautam Punukollu, New York, NY (US);
Jeffrey Tsui, Palo Alto, CA (US);
Morten Kromann, Copenhagen (DK);
Nikhil Seetharaman, Palo Alto, CA (US); Raj Krishnan, Mumbai (IN);
Samuel Jones, Chelmsford, MA (US);
Tareq Alkhatib, Richmond (CA);
Dayang Shi, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 554 days.

(21) Appl. No.: 16/293,690

(22) Filed: Mar. 6, 2019

(65) Prior Publication Data
US 2020/0204578 A1 Jun. 25, 2020

(30) Foreign Application Priority Data
Dec. 20, 2018 (GB) .................................. 1820853

(51) Int. Cl.
*G06F 11/00* (2006.01)
*H04L 9/40* (2022.01)
(Continued)

(52) U.S. Cl.
CPC ............ *H04L 63/1433* (2013.01); *G06F 8/65* (2013.01); *H04L 63/1441* (2013.01); *H04L 67/36* (2013.01)

(58) Field of Classification Search
CPC . H04L 63/1433; H04L 63/1441; H04L 67/36; H04L 63/145; H04L 29/06904;
(Continued)

(56) References Cited

U.S. PATENT DOCUMENTS

| 7,013,395 | B1 | 3/2006 | Swiler et al. |
| 7,287,689 | B2 | 10/2007 | Tidwell et al. |

(Continued)

FOREIGN PATENT DOCUMENTS

| EP | 1589716 | 10/2005 |
| EP | 3110104 | 12/2016 |

(Continued)

OTHER PUBLICATIONS

Official Communication for U.S. Appl. No. 14/970,317 dated Mar. 21, 2016.
(Continued)

*Primary Examiner* — Thu Ha T Nguyen
(74) *Attorney, Agent, or Firm* — Faegre Drinker Biddle & Reath LLP

(57) ABSTRACT

A method, apparatus, and computer program are disclosed. The method may be performed by one or more processors and may comprise receiving first data representing an infrastructure of a computer network, the first data comprising an indication of hosts which form at least part of the computer network and one or more software resources on respective hosts. The method may also comprise receiving second data from a vulnerability scanning software, the second data comprising an indication of one or more vulnerabilities detected in the one or more software resources provided on
(Continued)

at least some of the hosts of the computer network. Using a combination of the first data and the second data, output data may be generated representing a risk profile of the computer network infrastructure, the output data indicating one or more subsets of hosts, determined as being at risk of being affected by the detected vulnerabilities by virtue of the software resources they provide for output on a user interface.

19 Claims, 6 Drawing Sheets

(51) Int. Cl.
*G06F 8/65* (2018.01)
*H04L 67/75* (2022.01)

(58) Field of Classification Search
CPC ......... H04L 29/06877; H04L 29/06884; G06F 8/65; G06F 21/577; G06F 21/57; G06F 8/60; G06F 8/61
USPC .................. 709/223, 224; 726/25, 22, 23
See application file for complete search history.

(56) References Cited

U.S. PATENT DOCUMENTS

| | | | |
|---|---|---|---|
| 7,472,421 B2 | 12/2008 | Cummins | |
| 8,132,260 B1 | 3/2012 | Mayer et al. | |
| 8,181,253 B1 | 5/2012 | Zaitsev et al. | |
| 8,295,898 B2 | 10/2012 | Ashfield et al. | |
| 8,434,150 B2 | 4/2013 | Xie et al. | |
| 8,533,319 B2 | 9/2013 | Draugelis | |
| 8,769,412 B2 | 7/2014 | Gill et al. | |
| 8,789,140 B2 | 7/2014 | Williams et al. | |
| 8,881,288 B1 | 11/2014 | Levy et al. | |
| 8,904,506 B1 | 12/2014 | Canavor et al. | |
| 8,918,883 B1* | 12/2014 | Boyle ................... | G06F 21/577 726/25 |
| 8,931,043 B2 | 1/2015 | Cooper et al. | |
| 9,319,419 B2 | 4/2016 | Sprague et al. | |
| 9,401,925 B1 | 7/2016 | Guo et al. | |
| 9,407,652 B1 | 8/2016 | Kesin et al. | |
| 9,537,880 B1 | 1/2017 | Jones et al. | |
| 9,576,119 B2 | 2/2017 | McGeehan et al. | |
| 9,600,659 B1* | 3/2017 | Bird ...................... | G06F 21/577 |
| 9,628,500 B1 | 4/2017 | Kesin et al. | |
| 9,720,674 B1 | 8/2017 | Spreha | |
| 9,800,603 B1 | 10/2017 | Sidagni | |
| 9,992,230 B1* | 6/2018 | Haverty ............. | H04L 63/0236 |
| 10,044,745 B1 | 8/2018 | Jones et al. | |
| 10,075,464 B2 | 9/2018 | Kesin et al. | |
| 10,129,282 B2 | 11/2018 | Jones et al. | |
| 10,298,603 B2 | 5/2019 | Becker et al. | |
| 10,320,830 B2* | 6/2019 | Ahuja ................. | H04L 63/1433 |
| 10,521,590 B2* | 12/2019 | Kandala ................ | G06F 21/577 |
| 10,643,002 B1* | 5/2020 | Veselov ........... | G06Q 20/40145 |
| 10,721,262 B2 | 7/2020 | Zorlular et al. | |
| 10,783,241 B2* | 9/2020 | Crabtree ................ | G06F 9/455 |
| 2004/0003285 A1 | 1/2004 | Whelan et al. | |
| 2004/0128508 A1 | 7/2004 | Wheeler et al. | |
| 2005/0125295 A1 | 6/2005 | Tidwell et al. | |
| 2005/0138413 A1 | 6/2005 | Lippmann et al. | |
| 2005/0157662 A1 | 7/2005 | Bingham et al. | |
| 2006/0021049 A1 | 1/2006 | Cook | |
| 2006/0156407 A1 | 7/2006 | Cummins | |
| 2006/0265324 A1 | 11/2006 | Leclerc et al. | |
| 2006/0265751 A1 | 11/2006 | Cosquer et al. | |
| 2007/0067846 A1 | 3/2007 | McFarlane et al. | |
| 2007/0169194 A1* | 7/2007 | Church ............... | H04L 63/1416 726/23 |
| 2008/0005555 A1 | 1/2008 | Lotem et al. | |
| 2008/0047016 A1* | 2/2008 | Spoonamore .......... | G06Q 10/06 726/25 |
| 2008/0082380 A1 | 4/2008 | Stephenson | |
| 2008/0222706 A1 | 9/2008 | Renaud et al. | |
| 2009/0292743 A1 | 11/2009 | Bigus et al. | |
| 2009/0319783 A1 | 12/2009 | Thorton | |
| 2010/0024017 A1 | 1/2010 | Ashfield et al. | |
| 2010/0046393 A1 | 2/2010 | Knapp et al. | |
| 2011/0126111 A1* | 5/2011 | Gill ........................ | G06F 21/577 715/736 |
| 2011/0295982 A1 | 12/2011 | Misra | |
| 2011/0296003 A1 | 12/2011 | McCann et al. | |
| 2012/0110058 A1* | 5/2012 | Kuroda ................... | H04L 63/08 709/203 |
| 2012/0124092 A1 | 5/2012 | Teranishi et al. | |
| 2012/0173710 A1 | 7/2012 | Rodriguez | |
| 2012/0185419 A1 | 7/2012 | Kuhn et al. | |
| 2012/0198489 A1 | 8/2012 | O'Connell et al. | |
| 2012/0284791 A1 | 11/2012 | Miller et al. | |
| 2013/0091052 A1 | 4/2013 | Kaperdal et al. | |
| 2013/0097709 A1* | 4/2013 | Basavapatna ....... | H04L 63/1416 726/25 |
| 2013/0239167 A1* | 9/2013 | Sreenivas ............. | G06F 21/577 726/1 |
| 2013/0239168 A1* | 9/2013 | Sreenivas ............... | G06F 21/57 726/1 |
| 2013/0239175 A1* | 9/2013 | Sigurdson ............... | G06F 21/35 726/25 |
| 2013/0239217 A1 | 9/2013 | Kindler et al. | |
| 2013/0254885 A1 | 9/2013 | Devost | |
| 2013/0275416 A1 | 10/2013 | Thomson et al. | |
| 2014/0053265 A1 | 2/2014 | Crowley | |
| 2014/0082691 A1 | 3/2014 | Warn et al. | |
| 2014/0082733 A1 | 3/2014 | Benefield | |
| 2014/0173738 A1 | 6/2014 | Condry et al. | |
| 2014/0173739 A1 | 6/2014 | Ahuja et al. | |
| 2014/0201345 A1 | 7/2014 | Abuelsaad et al. | |
| 2014/0279684 A1 | 9/2014 | Liao et al. | |
| 2015/0026027 A1 | 1/2015 | Priess et al. | |
| 2015/0047026 A1 | 2/2015 | Neil et al. | |
| 2015/0089568 A1 | 3/2015 | Sprague et al. | |
| 2015/0195300 A1 | 7/2015 | Adjaoute | |
| 2015/0229664 A1* | 8/2015 | Hawthorn ........... | H04L 63/1433 726/25 |
| 2015/0235152 A1 | 8/2015 | Eldardiry et al. | |
| 2015/0326601 A1 | 11/2015 | Grondin et al. | |
| 2016/0080406 A1* | 3/2016 | Sadovsky ........... | H04L 63/1425 726/23 |
| 2016/0191532 A1 | 6/2016 | Seiver et al. | |
| 2017/0099311 A1 | 4/2017 | Kesin et al. | |
| 2017/0111381 A1 | 4/2017 | Jones et al. | |
| 2017/0195354 A1 | 7/2017 | Kesin et al. | |
| 2017/0302531 A1 | 10/2017 | Maes | |
| 2017/0337379 A1* | 11/2017 | Johar ..................... | G06F 21/577 |
| 2018/0063175 A1* | 3/2018 | Kandala ................ | G06F 21/577 |
| 2018/0189497 A1* | 7/2018 | Sukhomlinov ......... | G06F 21/50 |
| 2018/0276372 A1 | 9/2018 | Crabtree et al. | |
| 2018/0322284 A1* | 11/2018 | Chiang ............... | H04L 63/1416 |
| 2018/0351973 A1 | 12/2018 | Becker et al. | |
| 2018/0351991 A1 | 12/2018 | Jones et al. | |
| 2018/0375892 A1* | 12/2018 | Ganor .................... | H04L 63/20 |
| 2019/0007441 A1 | 1/2019 | Kesin et al. | |
| 2019/0081971 A1 | 3/2019 | Jones | |
| 2019/0129705 A1* | 5/2019 | Bulut ..................... | G06F 21/50 |
| 2019/0245894 A1* | 8/2019 | Epple ................. | H04L 63/1425 |
| 2019/0258807 A1* | 8/2019 | DiMaggio ............ | G06F 21/577 |
| 2019/0342296 A1* | 11/2019 | Anandam ............ | H04L 63/101 |
| 2020/0285752 A1* | 9/2020 | Wyatt ................... | G06F 21/554 |
| 2020/0320203 A1* | 10/2020 | Ting ..................... | G06F 21/577 |

(56) References Cited

U.S. PATENT DOCUMENTS

2021/0026952 A1   1/2021   Eggleton et al.
2021/0168150 A1*  6/2021   Ross .................... G06Q 10/105

FOREIGN PATENT DOCUMENTS

EP       3133522        2/2017
EP       3139318 A1     3/2017

OTHER PUBLICATIONS

Notice of Allowance for U.S. Appl. No. 15/224,443 dated Dec. 19, 2016.
Official Communication for U.S. Appl. No. 16/035,956 dated Sep. 9, 2019.
Official Communication for European Patent Application No. 16176273.7 dated Oct. 21, 2016.
Official Communication for U.S. Appl. No. 15/462,540 dated Jul. 5, 2017.
Official Communication for U.S. Appl. No. 15/207,343 dated May 17, 2017.
Official Communication for U.S. Appl. No. 15/207,343 dated Nov. 23, 2016.
Bhuyan et al., "Network Anomaly Detection: Methods, Systems and Tools," First Quarter 2014, IEEE.
Notice of Allowance for U.S. Appl. No. 14/982,699 dated Oct. 7, 2016.
Official Communication for U.S. Appl. No. 14/982,699 dated Aug. 26, 2016.
Notice of Allowance for U.S. Appl. No. 15/462,540 dated May 10, 2018.
Notice of Allowance for U.S. Appl. No. 16/042,702 dated Jan. 7, 2019.
Official Communication for U.S. Appl. No. 15/395,483 dated Jul. 6, 2017.
Official Communication for U.S. Appl. No. 15/434,930 dated Dec. 29, 2017.
Notice of Allowance for U.S. Appl. No. 14/970,317 dated May 26, 2016.
Official Communication for U.S. Appl. No. 14/982,699 dated Mar. 25, 2016.
Official Communication for U.S. Appl. No. 16/109,379 dated Jul. 17, 2019.
Notice of Allowance for U.S. Appl. No. 15/434,930 dated May 23, 2018.
Official Communication for European Patent Application No. 16184823.9 dated May 23, 2018.
Official Communication for U.S. Appl. No. 15/462,540 dated Oct. 13, 2017.
Notice of Allowance for U.S. Appl. No. 15/207,343 dated Apr. 3, 2018.
Official Communication for U.S. Appl. No. 15/207,343 dated Sep. 27, 2017.
Official Communication for U.S. Appl. No. 16/109,379 dated Nov. 2, 2018.
Official Communication for European Patent Application No. 16184823.9 dated Nov. 24, 2016.
Official Communication for U.S. Appl. No. 15/395,483 dated Mar. 28, 2018.
Official Communication for U.S. Appl. No. 16/359,021 dated Jun. 28, 2019.
Official Communication for U.S. Appl. No. 15/395,483 dated Sep. 21, 2017.

* cited by examiner

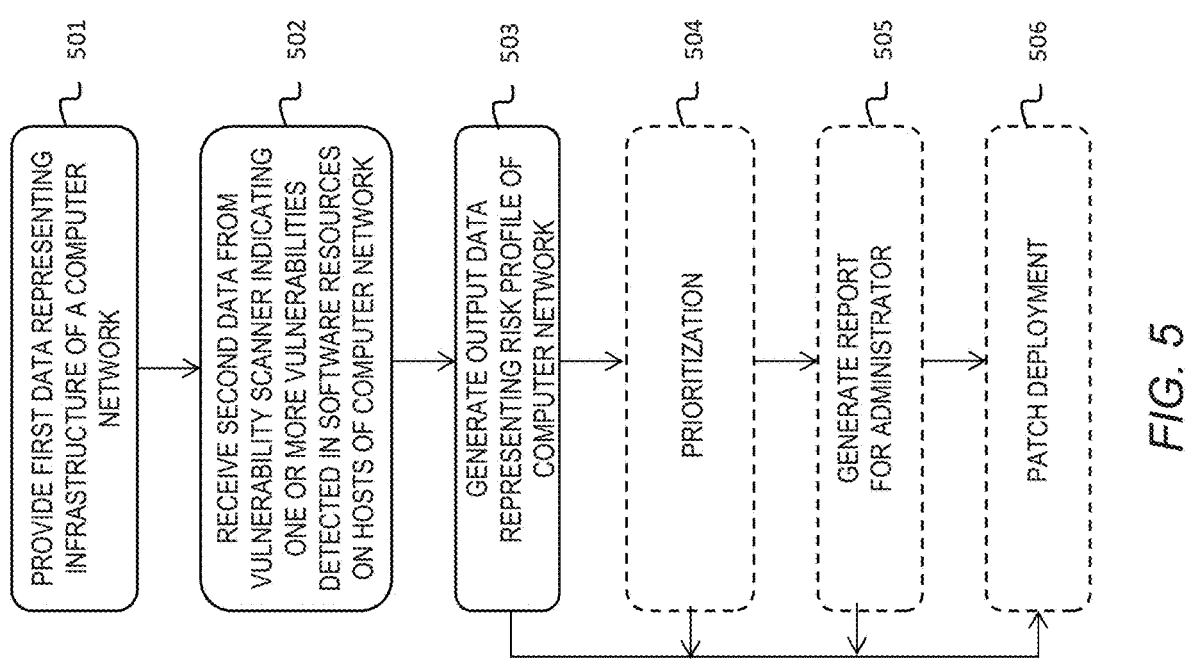

DETECTION OF VULNERABILITIES IN A COMPUTER NETWORK

CROSS REFERENCE TO RELATED APPLICATIONS

This application claims priority to UK Patent Application No. 1820853.8, filed on Dec. 20, 2018, incorporated by reference herein for all purposes.

FIELD OF THE DISCLOSURE

The present disclosure relates to methods and systems for detection of vulnerabilities in a computer network.

BACKGROUND

Organisations may provide a computer network formed of multiple hosts running one or more software resources. Hosts may communicate over the computer network by means of any available wired or wireless communication protocol, such as using the Internet Protocol (IP) or any similar or related protocol. As will be appreciated, vulnerabilities may exist at a given time in one or more hosts by virtue of vulnerabilities in their software. Vulnerability in this context is a weakness which can be exploited by an attacker to perform unauthorized actions within a computer system. An attack method may be termed an exploit. For example, a computer virus may exploit a vulnerability to affect the host or its software resources, which can have serious impacts. Due to the complex nature of many computer networks, and the diverse number and range of software resources they operate, which may change over time, detecting and remedying vulnerabilities and exploits can be burdensome in terms of resource and time-management issues.

For example, a "host" as used herein may include any form of computer that belongs to a computer network, and may include, but is not limited to, personal computers, laptops, servers, mobile telephones, digital assistants, routers, modems, bridges and domain controllers. Hosts may, for example, be assigned a network address.

For example, "Software" or "software resources" may comprise any program or other operating information used by a host, stored on a host or run on a host. Software may, for example, comprise operating systems, applications, system or machine controlling code, firmware, middleware, database controller applications and so on. As an example, software may be stored in one or more network databases and is capable of being accessed by applications on hosts that share common access to the network database. Database-related software may for example be a data analysis application, a data transformation application, a report generating application, a machine learning process, a spreadsheet or a database, or part of a spreadsheet or part of a database, e.g., records.

SUMMARY

According to one embodiment, there is provided a method, performed by one or more processors, the method comprising: receiving first data representing an infrastructure of a computer network, the first data comprising an indication of hosts which form at least part of the computer network and one or more software resources on respective hosts; receiving second data from a vulnerability scanning software, the second data comprising an indication of one or more vulnerabilities detected in the one or more software resources provided on at least some of the hosts of the computer network; generating, using a combination of the first data and the second data, output data representing a risk profile of the computer network infrastructure, the output data indicating one or more subsets of hosts, determined as being at risk of being affected by the detected vulnerabilities by virtue of the software resources they provide for output on a user interface.

In some examples, the method may further comprise determining a number of downstream hosts that take data from the one or more subsets of hosts and indicating said number of downstream hosts in the output data.

In certain examples, the method may further comprise: determining one or more patches for remedying the detected vulnerabilities; and presenting the output data on a user interface with an indication of the determined one or more patches on the user interface, the one or more patches being deployable through the user interface.

According to some examples, each of the one or more subsets of hosts or vulnerabilities represented by the output data may be arranged on a user interface based on one or more prioritization rules, the performance of which is dependent on the infrastructure of the computer network.

According to certain examples, the prioritization rules may determine the arrangement based on how critical one of the subset of hosts is to the infrastructure of the computer network.

In some examples, the first data may comprise an indication of the type or role for each host, and wherein how critical one of the subset of hosts is to the computer network is determined based on their respective type or role.

In certain examples, how critical one of the subset of hosts is to the computer network may be determined based on the number of hosts that take data from the at-risk hosts, those with a greater number of downstream hosts being arranged so as to indicate a higher priority.

According to some examples, the method may further comprise receiving third data indicative of users or groups of users associated with particular hosts, and wherein the output data further comprises a list of one or more users associated with the subset of hosts and wherein how critical one of the subset of hosts is to the computer network is based on the role of the users, or groups of users, associated with said subset of hosts.

According to certain examples, the method may further comprise receiving third data indicative of users or groups of users associated with particular hosts, and wherein the output data further comprises a list of one or more users associated with the one or more subsets of hosts and wherein how critical one of the subset of hosts is to the computer network is based on the number of users associated with said subset of hosts.

In some examples, the method may further comprise determining a patch deployment strategy based on one or more prioritization rules, the performance of which is dependent on the infrastructure of the computer network, the prioritization rules determining an order of one or more patches to deploy to remedy the detected vulnerabilities.

In certain examples, the deployment strategy may determine the least number of patches required to remedy the detected vulnerabilities.

According to some examples, the prioritization rules may identify a number N of most-critical vulnerabilities and the deployment strategy determines the least number of patches required to remedy all of the most-critical vulnerabilities.

According to certain examples, the method may further comprise deploying patches using the determined patch deployment strategy.

In some examples, the method may further comprise automatically generating an electronic report representing the patch deployment strategy for electronic transmission to a remote organization with an indication of the determined patch deployment strategy.

In certain examples, the electronic report may comprise one or more embedded links for user-selection to deploy the patches.

According to some examples, the method may further comprise automatically requesting deployment of the patches according to the patch deployment strategy.

According to certain examples, the method may further comprise using the first data and the second data to automatically infer one or more vulnerabilities on one or more hosts of the computer network infrastructure which, in a previous scanning iteration, were not scanned by the vulnerability scanning software, the inferring comprising identifying from the first data and the second data a detected vulnerability in a particular software resource and using the first data to identify non-scanned hosts providing the particular software resource, said inferred one or more hosts being indicated in the output data.

According to certain embodiments, there is provided a computer program, optionally stored on a non-transitory computer readable medium program which, when executed by one or more processors of a data processing apparatus, causes the data processing apparatus to carry out a method according to any preceding description.

According to another aspect, there is provided an apparatus configured to carry out a method according to any preceding method description, the apparatus comprising one or more processors or special-purpose computing hardware.

BRIEF DESCRIPTION OF THE DRAWINGS

Example embodiments will now be described by way of non-limiting example with reference to the accompanying drawings, in which:

FIG. 5 is a flow diagram showing processing operations that may be performed by the vulnerability management system according to some embodiments;

FIGS. 6A-6D are schematic diagrams of part of a computer network comprising multiple hosts having software, illustrating example prioritization strategies, according to certain embodiments;

DETAILED DESCRIPTION OF CERTAIN EMBODIMENTS

Figure 1:
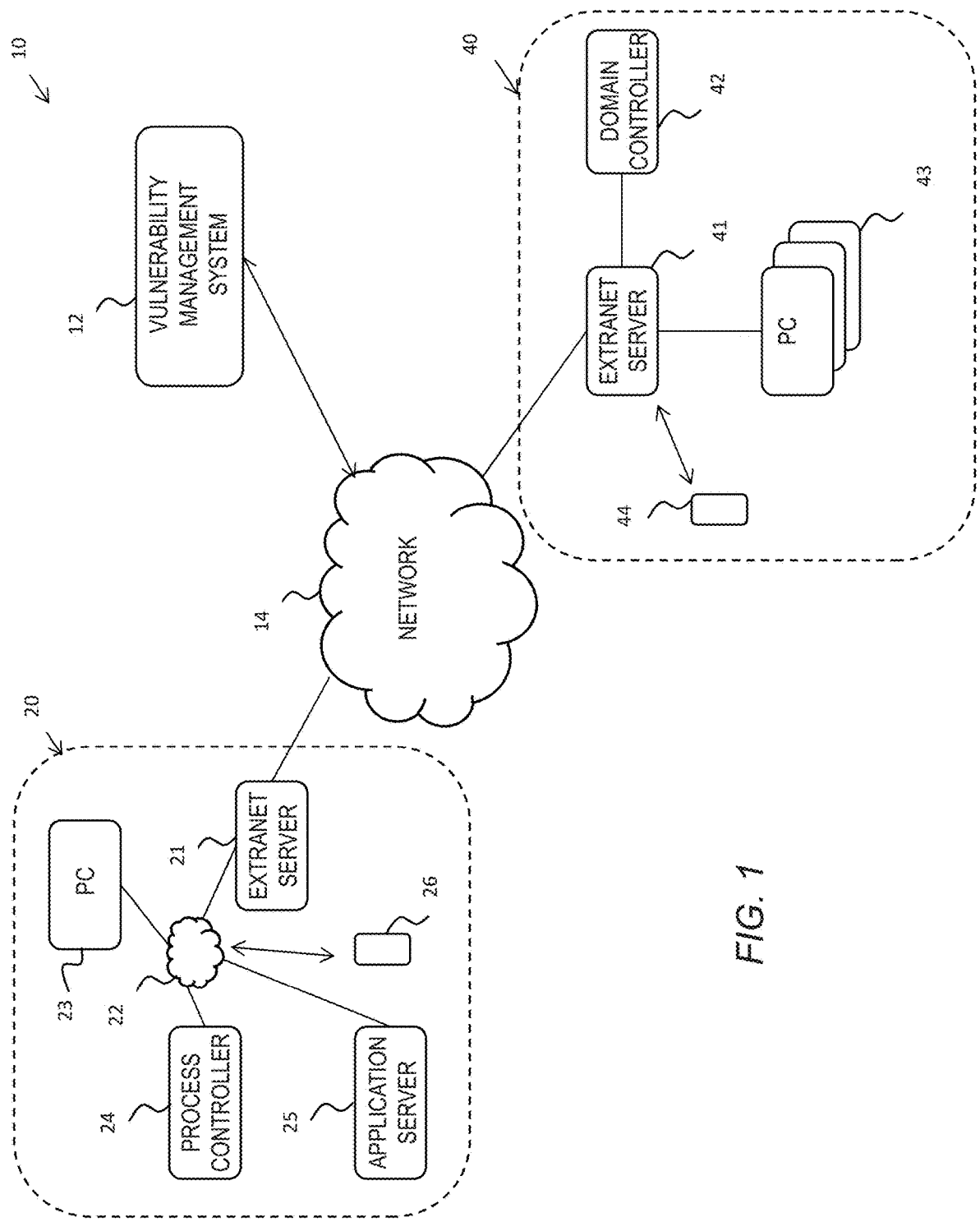
FIG. 1 is a schematic view of a computer network comprising a plurality of organisational computer networks and a vulnerability management system according to some embodiments.

Reference will now be made in detail to specific example embodiments for carrying out the subject matter of the present disclosure. In the following description, specific details are set forth in order to provide a thorough understanding of the subject matter. It shall be appreciated that embodiments may be practiced without some or all of these specific details.

Example embodiments relate to the detection of vulnerabilities in a computer network. Example embodiments may relate to the centralised management and detection of vulnerabilities for one or more organisations operating respective organisational computer network infrastructures. The centralised management may be for multiple independent organisation computer network infrastructures. Each organisation may have a different infrastructure having different characteristics and requirements in terms of security and remedying vulnerabilities.

In some embodiments, a computer network infrastructure generally comprises a mixture of hosts and software resources associated with a common organisation or entity, and may therefore have a common network domain or a plurality of related network domains, such as different territorial intranets belonging to the same parent organisation. For example, the term "infrastructure" may also refer to characteristics of the computer network, such as the type of interconnections, number of users, type of users, number and type of computers etc.

Example embodiments may also relate to providing a holistic view of an organization's computer network in terms of detected vulnerabilities, to permit risks to be notified and visualized, where in the network's infrastructure the vulnerabilities sit, and related information such as a patch deployment strategy, a possible area visualization and/or "blast zone" of affected hosts affected or likely to be affected.

In some examples, collectively, "computer resources" as used herein may refer to hosts and/or software resources stored or run by one or more hosts.

In certain examples, a "host" as used herein may include any form of computer that belongs to a computer network, and may include, but is not limited to, personal computers, laptops, servers, mobile telephones, digital assistants, routers, modems, bridges and domain controllers. For example, hosts may be assigned a network address.

According to some examples, "Software" or "software resources" may comprise any program or other operating information used by a host, stored on a host and/or executed on a host. Software may comprise operating systems, applications, system or machine controlling code, firmware, middleware, database controller applications and so on. Database-related software may for example be a data analysis application, a data transformation application, a report generating application, a machine learning process, a spreadsheet or a database, or part of a spreadsheet or part of a database, e.g., records. Software may be stored on tangible, non-volatile media, as will be mentioned later on.

According to certain examples, organisations are vulnerable to cyber-attacks which can affect computer resources. This can also have serious repercussions for computer resources and has the potential to seriously affect an organisation's operations. For example, if computer resources are associated with controlling a physical system, such as a machine or control mechanism of an industrial plant (e.g., an oil refinery), then proper operation of the machine or control mechanism may be hindered or a shut-down, at least partially, may be required. Organisations may employ their own dedicated system support staff to run vulnerability scanning software and to manually patch vulnerabilities as and when identified. This may require significant resources in terms of both people and time, particularly in medium and larger organisations. Further, there may be blind-spots within an organisation's computing infrastructure where vulnerability scanners cannot reach. This may be due to access restrictions on certain computer resources that prevent the scanning software from scanning these entities. This may also be due to certain computer resources, e.g., mobile hosts, not being connected to the network at the time the scan is performed.

In some examples, a vulnerability is a weakness in a computer resource, for example within software, which can be exploited by an attacker to perform unauthorized actions within a computer system. An attack method may be termed an exploit.

Embodiments herein provide systems and methods providing first data representing an infrastructure of a computer network, the first data comprising an indication of hosts which form at least part of the computer network and one or more software resources provided on respective hosts.

Embodiments may also involve receiving second data from vulnerability scanning software, the second data comprising an indication of one or more vulnerabilities detected in one or more of software resources provided on at least some of the hosts of the computer network.

Embodiments may also involve generating, using a combination of the first and second data, output data representing a risk profile of the computer network infrastructure, the output data indicating at least a subset of hosts at risk of being affected by the detected vulnerabilities by virtue of the software resources they provide.

Embodiments may also involve providing the output data on a user interface. For example, the output data may be provided through a web-page or through a dedicated graphical user interface (GUI) that can be viewed and/or interacted with. For example, an interactive GUI may enable different views of an organization's computer network infrastructure and the effect of vulnerabilities to give a snapshot, holistic view of vulnerabilities that exist. Different vulnerabilities or groups of vulnerabilities may be selected to 'drill down' and see more detailed information about the selected vulnerability and/or the affected host(s).

Embodiments may also involve using prioritisation logic to determine how the output data is displayed and/or arranged on the user interface, e.g., in terms of what vulnerabilities should be given more prominence or selected over other vulnerabilities in a limited display area. For example, parts of the infrastructure affected by vulnerabilities, determined to be more critical than other parts, may be given more prominence and/or displayed in favour of less-critical parts of the infrastructure. This prioritization, based on criticality, may be qualitative and/or quantitative. For example, a single vulnerability detected in software of a host that serves a large number of users and/or provides data to a large number of downstream hosts may be determined to be more critical than multiple vulnerabilities detected at a host that serves very few others hosts or users. For example, the role provided by an affected host may determine how critical it is. If the host controls a critical process, e.g., an industrial system, then it may be determined more critical than a host that serves, e.g., an administrative function of the organization.

In some examples, the prioritisation logic may also dictate or influence a patch deployment strategy. In this respect, it will be appreciated that a patch comprises code, e.g., a script and/or program, that is designed to fix and/or mitigate a vulnerability. For example, if a particular version of an operating system or application is found to have a vulnerability, then a patch might comprise a relatively simple script to remove the vulnerability or the patch might even comprise a newer version of the software. Patches may comprise fixes to multiple vulnerabilities in one file or a batch of files, downloaded together.

In certain examples, a patch deployment strategy in example embodiments is a prioritization of which patches to deploy to achieve some desired result in terms of remediation efficiency. For example, based on the particular infrastructure of an organization, which may be significantly different from another organisation, deploying a particular order of patches may remove or mitigate all or most critical vulnerabilities more quickly or efficiently, e.g., using fewer downloads from the patch provider. This strategy may be different for other organizations due to their respective infrastructures.

According to some examples, as will be appreciated, vulnerability scanning software may be off-the-shelf, commercially available software, of which there are many available types. For example, the vulnerability scanning software may be NESSUS® which functions to scan hosts and the software provided on each host to generate output data, typically in the form of a list of detected vulnerabilities which may be provided in various formats such as plain text, XML and HTML. The particular vulnerability scanning software may obtain details about known vulnerabilities from external sources.

In some embodiments herein, the first data representing the infrastructure of an organization's computer network may comprise data from one or more sources, for example, including a systems management and/or configuration manager application provided on one or more hosts of the computer network. For example, a server of the computer network may run a system management application such as the Microsoft System Center Configuration Manager (SCCM), also known as ConfigMgr. A systems management application such as SCCM provides many different types of information that can be used to build, for example, a data representation "picture" of a network infrastructure, such as an inventory of hardware on the network, server availability, software inventory, storage management, etc. From this, a data representation of all hosts, what software they are running, and other information that may be been defined by an administrator of the network (e.g., the role of the host computer, what function it performs, which department it resides in, what hosts it is connected to, its system address/domain etc.) may be built.

In certain embodiments herein, the first data may also comprise further information such as data representing users within the organization using one or more of said hosts. For example, data from Microsoft Active Directory (AD) may be received; AD providing a directory service for users, enabling visibility as to which users currently and historically have logged onto various hosts, have used various software resources on those hosts, and/or have performed various operations and functions.

In some embodiments, by ingesting data from various sources, including first data which represents at least the configuration of hosts and software of an organization's computer network, e.g. using SCCM, and possibly augmented with user data from an application such as AD, and combining with the output generated by a vulnerability scanning software such as NESSUS for that network, an organization-specific set of output data may be generated representing the risk profile of that organization at a particular time. Based on this, the above-mentioned prioritizations may be performed, including for example, patch deployment scheduling.

FIG. 1 is a network diagram depicting a network system 10 which includes a vulnerability management system (VMS) 12 according to some embodiments. The VMS 12 may be a service provided remotely from a first customer network 20 and a second customer network 40 which are networks belonging to different, unrelated customers that utilize the service of the VMS. Communication between the VMS 12 and the customer networks 20, 40 is through a data network 14 which can be any type of network, e.g., the Internet.

In some examples, as will be seen from FIG. 1, the first customer network 20 has a different infrastructure than that of the second customer network 40. More particularly, the first customer network 20 comprises an extranet server 21, an internal network (e.g., representing an intranet 22) which connects with one or more PCs 23, one or more process controllers 24, one or more application servers 25 and one or more mobile terminals 26 such as mobile telephones, laptops etc. The second customer network 40 may comprise an extranet server 41, one or more domain controllers 42, one or more PCs 43 and one or more mobile terminals 44 such as mobile telephones, laptops etc.

In certain examples, it will be appreciated that the first and second customer networks 20, 40 are simplified and may be much larger and significantly more complex. For example, each customer network 20, 40 has a different respective infrastructure which can be represented using data from, e.g., the SCCM and/or AD data, from one of the systems within those customer networks. This permits tailoring of the risk profiles and deployment strategies that may be advised for each.

Figure 2:
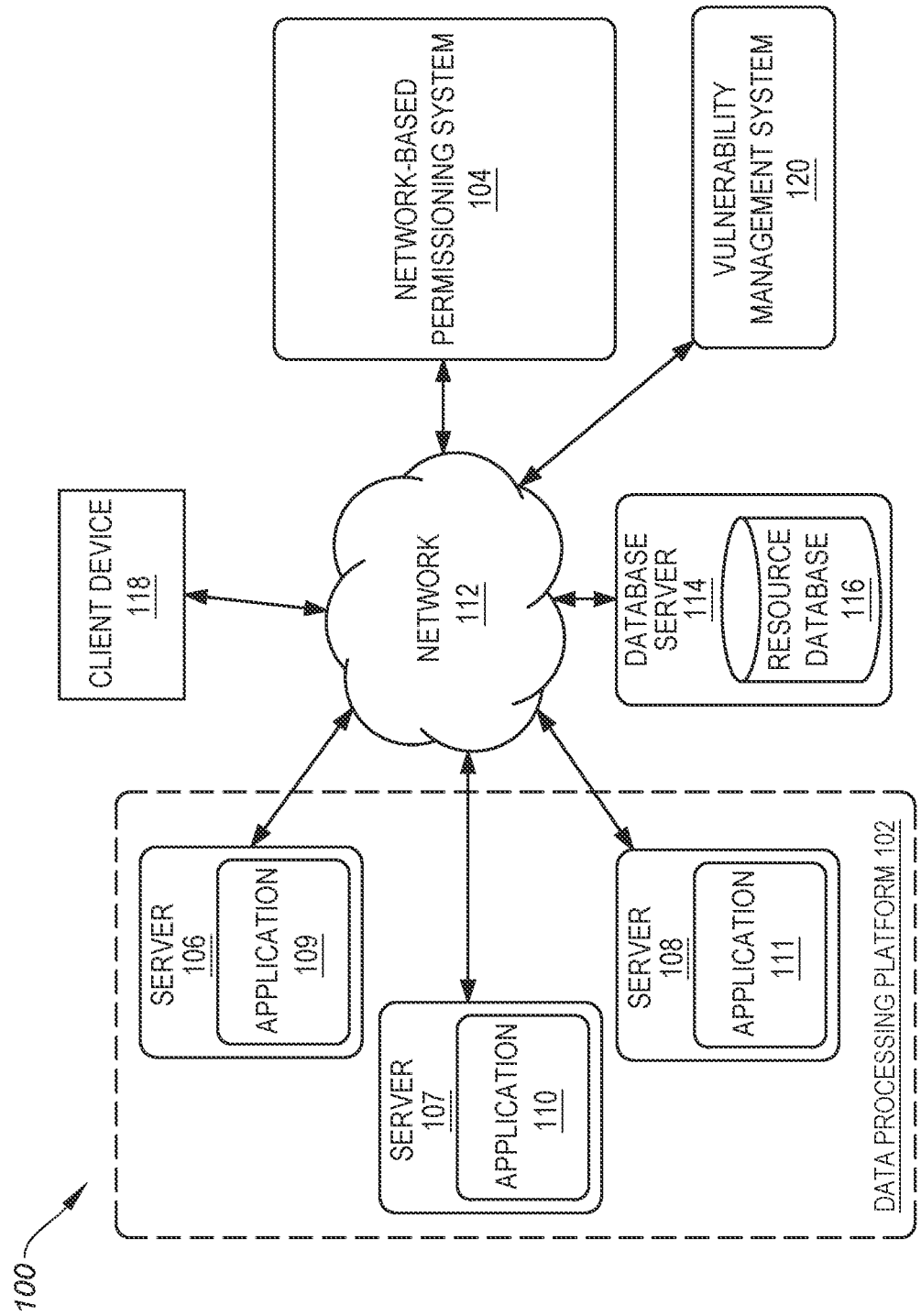
FIG. 2 is a schematic view of another computer network comprising a data processing platform for access by multiple clients and a vulnerability management system according to certain embodiments.

FIG. 2 is a network diagram depicting another network system 100 comprising a data processing platform 102 in communication with a VMS 120 according to certain embodiments, and also a network-based permissioning system 104 configured for evaluating access permissions for data resources to which the group of application servers 106-108 share common access. Consistent with some embodiments, the network system 100 may employ a client-server architecture, though the present inventive subject matter is, of course, not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

In some examples, the data processing platform 102 includes a group of servers—specifically, servers 106-108, which host network applications 109-111, respectively. The network applications 109-111 hosted by the data processing platform 102 may collectively compose an application suite that provides users of the network system 100 with a set of related, although independent, functionalities that are accessible by a common interface. For example, the network applications 109-111 may compose a suite of software application tools that can be used to analyse data to develop various insights about the data, and visualize various metrics associated with the data. To further this example, the network application 109 may be used to analyse data to develop particular metrics with respect to information included therein, while the network application 110 may be used to render graphical representations of such metrics. It shall be appreciated that although FIG. 2 illustrates the data processing platform 102 as including a particular number of servers, the subject matter disclosed herein is not limited to any particular number of servers and in other embodiments, fewer or additional servers and applications may be included.

In certain examples, each of the servers 106-108 are in communication with the network-based permissioning system 104 and VMS 120 over a network 112 (e.g. the Internet or an intranet). Each of the servers 106-108 are further shown to be in communication with a database server 114 that facilitates access to a resource database 116 over the network 112, though in other embodiments, the servers 106-108 may access the resource database 116 directly, without the need for a database server 114. The resource database 116 stores data resources that may be used by any one of the applications 109-111 hosted by the data processing platform 102.

According to some examples, the VMS 120 is configured to operate similarly to the VMS 12 described with reference to FIG. 1.

According to certain examples, within an established login or access session, to access data resources from the resource database 116, the servers 106-108 transmit access requests via the network 112 to the network-based permissioning system 104. An access request includes a data resource identifier and a user identifier corresponding to a user (also referred to herein as, e.g., a "requesting user") who may be utilizing one of the applications 109-111 to access to the data resource (also referred to herein as, e.g., a "requesting application"). The network-based permissioning system 104 may include an application programming interface (API) or other machine interface to receive such access requests from the server 106-108 hosting the requesting application 109-111.

In some examples, upon receiving an access request for a particular data resource, the network-based permissioning system 104 accesses a separately stored policy object associated with the particular data resource. Policy objects are stored in a database of the network-based permissioning system 104, which is maintained independently of the resource database 116.

In certain examples, a policy object is a data structure that includes an identifier (e.g., a globally unique resource identifier) of the data resource to which it is associated, one or more identifiers of a parent data resource from which the data resource depends (referred to as, e.g., a "parent identifier"), and policy information that includes dependent resource identifiers. The policy information also includes one or more statements that specify operations the user is or is not authorized to perform with respect to the data resource based on satisfaction of one or more conditions. Authorized operations may be globally applicable to the network system 100, and/or may be specific to any one of the network applications 109-111.

According to some examples, the network-based permissioning system 104 uses the policy information in the corresponding policy object to determine the user's access permissions with respect to the data resource. Once the network-based permissioning system 104 determines the user's access permission with respect to the data resource, the network-based permissioning system 104 communicates a response to the access request to the requesting application. More specifically, the network-based permissioning system 104 communicates one or more data packets (e.g., computer-readable information) to the server hosting the requesting application as a response to the access request. The response to the access request includes the identified requesting user's access permissions with respect to the data resource. The requesting user's access permissions may include one or more authorized operations the user may perform on the data resource.

According to certain examples, the network-based permissioning system 104 serves as a centralized permissioning system for the data processing platform 102 to evaluate access permissions of users of the network system 100 with respect to data 3o resource stored in the resource database 116. In this way, the network-based permissioning system 104 obviates the need for the network applications 109-111 to have distinct, dedicated permissioning systems. As a result, the network applications 109-111 can operate and function independently from one another while maintaining consistency with respect to the user's access permissions of shared data resources.

In some examples, as shown, the network system 100 also includes a client device 118 in communication with the data processing platform 102 and the network-based permissioning system 104 over the network 112. The client device 118 communicates and exchanges data with the data processing platform 102.

In certain examples, the client device 118 may be any of a variety of types of devices that include at least a display, a processor, and/or communication capabilities that provide access to the network 112 (e.g., a smart phone, a tablet computer, a personal digital assistant (PDA), a personal navigation device (PND), a handheld computer, a desktop computer, a laptop or netbook, and/or a wearable computing device), and may be operated by a user (e.g., a person) to exchange data with other components of the network system 100 that pertains to various functions and aspects associated with the network system 100 and its users. The data exchanged between the client device 118 and the data processing platform 102 involve user-selected functions available through one or more user interfaces (UIs). The UIs may be specifically associated with a web client (e.g., a browser) and/or an application executing on the client device 118 that is in communication with the data processing platform 102. For example, the network-based permissioning system 104 provides user interfaces to a user of the client device 118 (e.g., by communicating a set of computer-readable instructions to the client device 118 that cause the client device 118 to display the user interfaces) that allow the user to register policies associated with data resources stored in the resource database 116.

Figure 3:
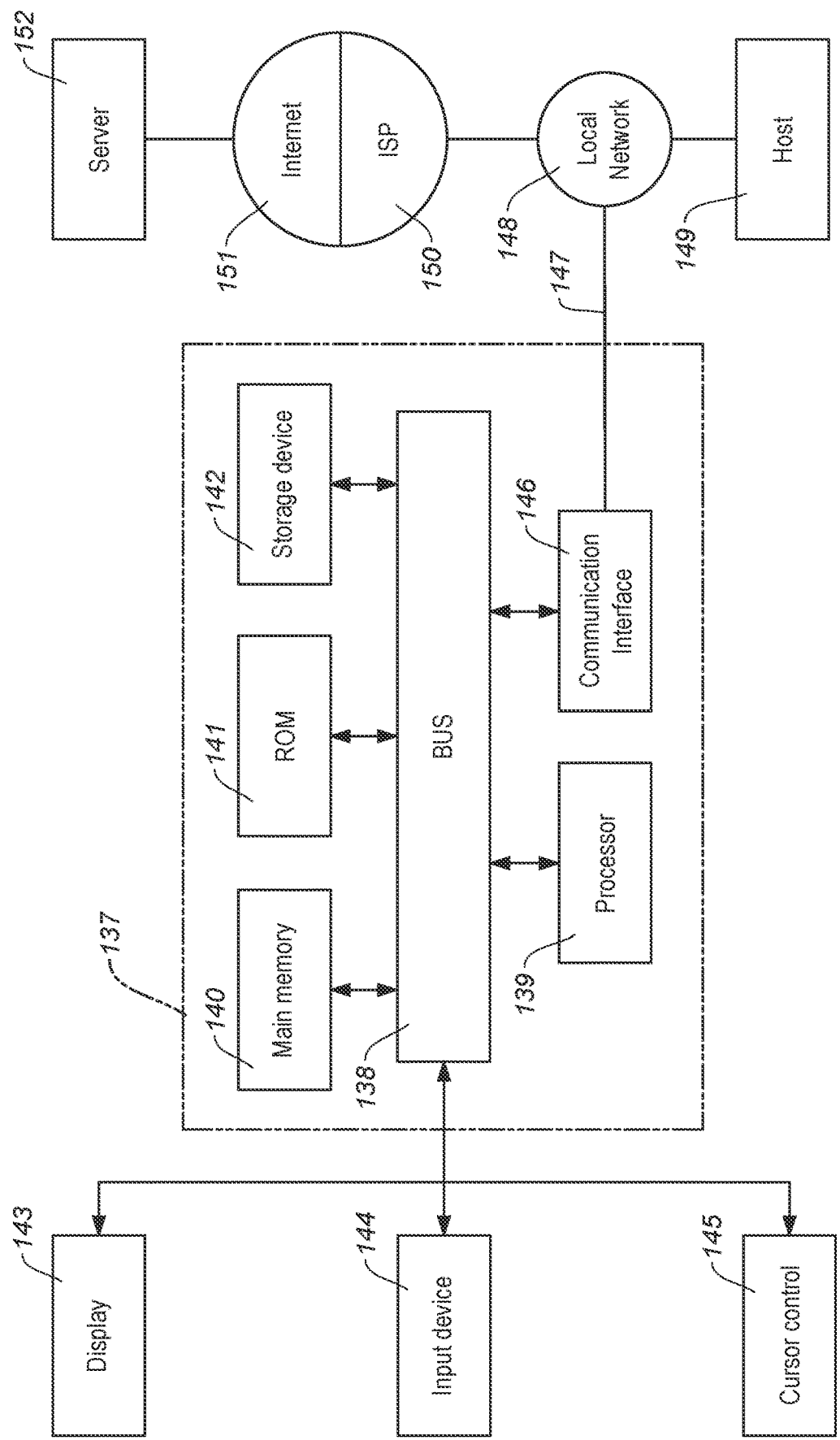
FIG. 3 is a block diagram that illustrates a computer system upon which an embodiment may be implemented according to some embodiments.

According to some embodiments, referring to FIG. 3, a block diagram of an exemplary computer system 137, which may comprise the data processing platform 102, one or more of the servers 106-108, the database server 114, the VMS 12, 120 and/or the network-based permissioning system 104, consistent with examples of the present specification is shown.

In some examples, the computer system 137 includes a bus 138, other communication mechanism for communicating information, and/or a hardware processor 139 coupled with the bus 138 for processing information. Hardware processor 139 can be, for example, a general purpose microprocessor. Hardware processor 139 comprises electrical circuitry.

In certain examples, the computer system 137 includes a main memory 140, such as a random access memory (RAM) or other dynamic storage device, which is coupled to the bus 138 for storing information and instructions to be executed by processor 139. The main memory 140 can also be used for storing temporary variables or other intermediate information during the execution of instructions by the processor 139. Such instructions, when stored in non-transitory storage media accessible to the processor 139, render the computer system 137 into a special-purpose machine that is customized to perform the operations specified in the instructions.

According to some examples, the computer system 137 further includes a read only memory (ROM) 141 or other static storage device coupled to the bus 138 for storing static information and instructions for the processor 139. A storage device 142, such as a magnetic disk or optical disk, is provided and coupled to the bus 138 for storing information and instructions.

According to certain examples, the computer system 137 can be coupled via the bus 138 to a display 143, such as a cathode ray tube (CRT), liquid crystal display, or touch screen, for displaying information to a user. An input device 144, including alphanumeric and/or other keys, is coupled to the bus 138 for communicating information and command selections to the processor 139. Another type of user input device is the cursor control 145, for example, using a mouse, a trackball, or cursor direction keys for communicating direction information and command selections to the processor 139 and for controlling cursor movement on the display 143. The input device, for example, has two degrees of freedom in two axes, a first axis (for example, x) and a second axis (for example, y), that allows the device to specify positions in a plane.

In some examples, the computer system 137 can implement the techniques described herein using customized hard-wired logic, one or more ASICs or FPGAs, firmware and/or program logic which in combination with the computer system causes or programs the computer system 137 to be a special-purpose machine. According to some embodiments, the operations, functionalities, and techniques disclosed herein are performed by the computer system 137 in response to the processor 139 executing one or more sequences of one or more instructions contained in the main memory 140. Such instructions can be read into the main memory 140 from another storage medium, such as the storage device 142. Execution of the sequences of instructions contained in the main memory 140 causes the processor 139 to perform the process steps described herein. In some embodiments, hard-wired circuitry can be used in place of and/or in combination with software instructions.

In certain examples, the term "storage media" as used herein refers to any non-transitory media that stores data and/or instructions that cause a machine to operate in a specific fashion. For example, such storage media can comprise non-volatile media and/or volatile media. Non-volatile media includes, for example, optical or magnetic disks, such as storage device 142. Volatile media includes dynamic memory, such as main memory 140. Common forms of storage media include, for example, a floppy disk, a flexible disk, hard disk, a solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

According to some examples, storage media is distinct from, but can be used in conjunction with, transmission media. Transmission media participates in transferring information between storage media. For example, transmission media includes coaxial cables, copper wire and fibre optics, including the wires that comprise the bus 138. Transmission media can also take the form of acoustic or light waves, such as those generated during radio-wave and/or infra-red data communications.

According to certain examples, various forms of media can be involved in carrying one or more sequences of one or more instructions to the processor 139 for execution. For example, the instructions can initially be carried on a magnetic disk or solid state drive of a remote computer. The remote computer can load the instructions into its dynamic memory and send the instructions over a telephone line or other transmission medium using a modem. A modem local to the computer system 137 can receive the data on the telephone line or other transmission medium and use an infra-red transmitter to convert the data to an infra-red signal. An infra-red detector can receive the data carried in the infra-red signal and appropriate circuitry can place the data on the bus 138. The bus 138 carries the data to the main memory 140, from which the processor 139 retrieves and executes the instructions. The instructions received by the main memory 140 can optionally be stored on the storage device 142 either before and/or after execution by the processor 139.

In some examples, the computer system 137 also includes a communication interface 146 coupled to the bus 138. The communication interface 146 provides a two-way data communication coupling to a network link 147 that is connected to a local network 148. For example, the communication interface 146 can be an integrated services digital network (ISDN) card, cable modem, satellite modem, or a modem to provide a data communication connection to a corresponding type of telephone line. As an example, the communication interface 146 can be a local area network (LAN) card to provide a data communication connection to a compatible LAN. Wireless links can also be implemented. For example, in any such implementation, the communication interface 146 sends and receives electrical, electromagnetic or optical signals that carry digital data streams representing various types of information.

In certain examples, the network link 147 typically provides data communication through one or more networks to other data devices. For example, the network link 147 can provide a connection through the local network 148 to a host computer 149 or to data equipment operated by an Internet Service Provider (ISP) 150. The ISP 150 in turn provides data communication services through the world wide packet data communication network now commonly referred to as, e.g., the "Internet" 151. The local network 148 and the internet 151 both use electrical, electromagnetic or optical signals that carry digital data streams. The signals through the various networks and the signals on the network link 147 and through the communication interface 146, which carry the digital data to and from the computer system 137, are example forms of transmission media.

According to some examples, the computer system 137 can send messages and receive data, including program code, through the network(s), network link 147 and communication interface 146. For example, a first application server 106 may transmit data through the local network 148 to a different application server 107, 108.

Figure 4:
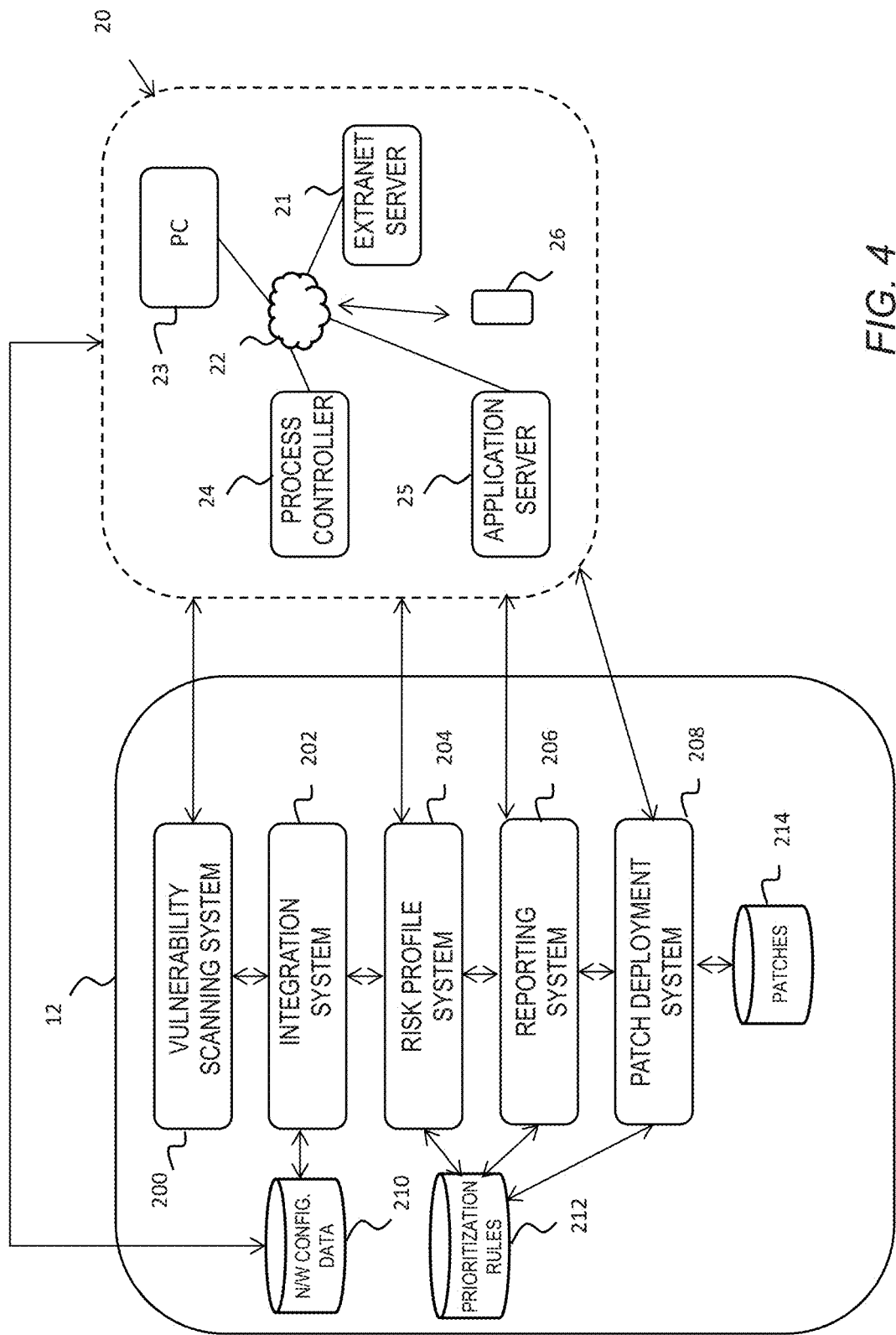
FIG. 4 is a block diagram showing functional components of a vulnerability management system according to certain embodiments, in relation to an organisational computer network.

According to certain embodiments, referring to FIG. 4, a more detailed view of the VMS 12 (or alternatively the VMS 120 shown in FIG. 2) is shown, and comprises a number of functional modules and/or systems. The VMS 12 is shown by way of example in relation to the first customer network 20 shown in FIG. 1. The VMS 12 comprises a vulnerability scanning system 200, which may be NESSUS and/or any other known vulnerability scanning system. The vulnerability scanning system may be in network communication with an external centralised database of current vulnerabilities which gets periodically updated. The VMS 12 also comprises an integration system 202 which is a service or process that ingests network configuration data 210 particular to the first customer network 20, for example data comprising one or more of SCCM data, AD data and/or other data from which a data representation of the first customer network 20 can be built in terms of at least hosts and software on the respective hosts (including version numbers), and possible including details of any existing patches and their current version/status, interconnections between hosts, the role of said hosts, users that are, or have, logged onto the various hosts and the software and operations they have performed etc.

In some examples, the integration system 202 also ingests the data resulting from the vulnerability scanning system 200 in relation to said network infrastructure of the first customer network 20 and hence builds a set of output data representing which hosts, by virtue of at least the software they run, are vulnerable. The output data may represent a list of all hosts and the vulnerabilities present on each, and may be provided in list-form and/or as a graphical map more akin to the topological view of the network shown FIG. 4.

In certain examples, a risk profile system 204 is also provided for generating from the output data an overall risk profile of the first customer network 20. The risk profile system 204 is configured to take the output data from the integration system 202 as input, and to provide an intuitive user interface, e.g., an interactive GUI, which may show the output data arranged in a particular way. For example, the output data may comprise only a subset of the output data, and/or may comprise a scrollable/navigable graphical representation of the output data. This permits a potentially large amount of data to be displayed on screens with limited display size. The output data may comprise a graphical map, again scrollable/navigable. The risk profile system 204 may provide a more holistic view of the first customer network 20 and the risks detected on the hosts of the network by virtue of its infrastructure and the results of the vulnerability scan. For example, the risk profile system 204 may arrange the vulnerabilities based on certain prioritization rules 212 for prioritizing both the arrangement of risk notifications on the GUI and/or for prioritizing how patches are to be deployed.

According to some examples, a reporting system 206 is also provided for generating reports for sending to administrators of the first customer network 20. In this respect, the first customer network 20 may have its own team of computer engineers and/or administrators responsible for network security, and makes use of the VMS 12 as an external service to provide periodic and/or ad-hoc reports as to risks as and when they are detected. The reporting system 206 may generate said reports, which may comprise a list of vulnerabilities and affected hosts in a particular order and/or arrangement in order to provide recommended patching strategies. The reports may be sent in an email directly to a dedicated email address associated with the administrator.

The report or email may provide a link to the GUI, opening of which may present the GUI for the first customer network 20, providing the list of vulnerabilities and/or a list of hosts at risk. For each vulnerability or host, the administrator may drill-down to see further information, for example the specific details of the vulnerability, when it was detected, what users are affected, or could be affected, and/or any patches available to remedy the vulnerability. Links may be embedded in the report to enable users to deploy the patches. The GUI may also indicate the potential effect of the vulnerability on other hosts, e.g., those which take data from the affected host or hosts. For example, a so-called "blast zone" depicting and/or representing the area of the network infrastructure that is at risk may be shown. The reporting system may also base the arrangement of its reports on the prioritization rules 212 so as to highlight more prominently those vulnerabilities and/or affected hosts deemed more critical to the particular infrastructure of the first customer network 20.

According to certain examples, a patch deployment system 208 is also provided for deploying patches for remedying one or more identified vulnerabilities. The patches may be obtained from an external system and stored at the VMS 12 in a database 214. Alternatively, the patch deployment system 208 may provide links to external systems providing said patches, rather than providing them locally. The prioritization rules 212 may similarly provide a patch deployment strategy that determines the order in which patches are deployed, which may be based on various factors including the particular configuration of the first customer network 20.

In some embodiments, patches may be deployed automatically, rather than requiring manual deployment. That is, based on the risk profile generated by ingestion of the first and second data (respectively the network configuration data and the vulnerability scanning results), the patch deployment system 208 may generate a patch deployment strategy according to the prioritization rules 212 and automatically deploy the patches without user interaction.

FIG. 5 is a flow diagram indicating processing operations performed by one or more processors of an appropriate computing system, for example using the system shown in FIG. 3, according to some embodiments. The processing operations are those that may be performed by the VMS 12 or the VMS 120 shown in FIGS. 1 and 2 respectively, in accordance with example embodiments.

In some examples, a first operation 501 may comprise providing first data representing the infrastructure of a computer network. The first data may be received from the computer network, for example from an administrative server and/or domain controller of the computer. As mentioned, the first data may comprise data from SCCM and/or AD or any similar system management software which provides at least a host and system inventory for the computer network.

In certain examples, a second operation 502, which may happen subsequent to, at the same time as, or even prior to, the first operation 501, may comprise receiving second data from a vulnerability scanning software indicating one or more vulnerabilities detected on software resources on hosts of the computer network. As mentioned, the second data may comprise data output by software such as NESSUS.

According to some examples, a third operation 503 may comprise generating output data, using the first and second data, representing the risk profile of the particular computer network.

According to certain examples, a fourth operation 504, which is optional, may comprise a prioritization based on predetermined rules and may relate to prioritization logic for arrangement of hosts and/or vulnerabilities represented in the output data on a user interface. The prioritization may determine which vulnerabilities and/or hosts, for example, are displayed more prominently on the user interface. Prominence may refer to, e.g., how high up a list the vulnerability or host is presented and/or its presentation in a particularly vivid style or colour. For example, more critical vulnerabilities may be shown at the top of the list and/or in red. Less critical vulnerabilities may be shown lower down and/or in a green colour. Other colours may be used to shown medium-priority vulnerabilities. An ontology may be provided for giving a more human-readable form of the output data on the user interface, for example a topological map showing the computer network and those computer resources affected and not-affected. The ontology may also indicate downstream effects of the vulnerable machines, i.e., what other computer resources are vulnerable due to a weakness in the upstream machine. Each organisation may have a respective ontology defining how the output data is to be shown on the user interface for that organisation. The output data may therefore be considered agnostic in the sense that what is displayed is based on the ontology rather than the output data in its raw form. The output data is transformed based on the ontology to provide the appropriate output for the particular organisation. For example, some organisations may wish to see a topological map of their computer network, with affected computers shown in a different colour, or shaded, or flashing, whereas other organisations may wish to see a prioritized list. The user interface may give the option to switch between different forms of user interface, e.g., between map and list.

In some examples, a fifth operation 505, also optional, may comprise generating an administrator report, which may comprise a prioritized list of the vulnerabilities based on prioritization rules. The order of vulnerabilities may be the same as is presented on the user interface following the previous operation 504.

In certain examples, a fifth operation 506, also optional, may comprise deploying patches. The patch deployment may be automatic or manual. The patch deployment may be based on a deployment strategy which may be based on prioritization rules. The order of patch deployment may be the same as is presented on the user interface following the previous operations, 504 and/or 505, if performed.

In some embodiments, some operations may be removed, re-ordered and/or replaced. The numbering of operations is not necessarily indicative of the order of processing.

In some examples, the prioritization rules 212 indicated in FIG. 4 provide for efficient presentation and/or deployment of vulnerabilities and how to patch them. Due to the risk profile being specific to the particular configuration of the computer network, based on a combination of first and second data, different networks may have different infrastructures and policies for avoiding or mitigating against security issues and/or system fails as a result of attacks. Accordingly, a predefined set of prioritization rules 212 may be provided that permit efficient notification and/or deployment. In some embodiments, the prioritization rules are provided such that their performance is dependent on the particular computer network infrastructure. In some embodiments, the prioritization rules may determine an order based on criticality, i.e., how critical an affected host is or even how critical a user or group of users associated with an effected host is or are. In this example, the network infrastructure is considered all features and characteristics received in the first data, including one or more of hosts, software on hosts, the role or purpose of the hosts and/or software, where the hosts sit in the network, e.g., under what sub-domains, what the role of users associated with those hosts are, how many hosts receive data from upstream hosts, how many users are associated with a particular host, the version of software on hosts, the version of operating systems on hosts, log data associated with hosts, websites visited by hosts, current patch statuses or versions on hosts, the last time a host or its software was scanned and so on.

Figure 6C:
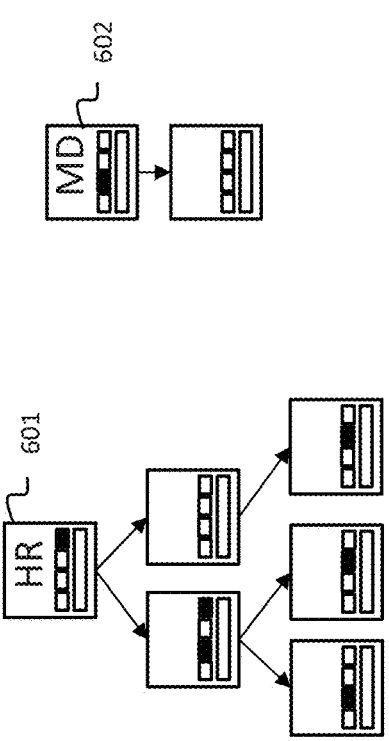

For example, one set of prioritization rules may prioritize presentation and/or patch deployment based on the number of downstream hosts or services of an affected host. FIG. 6A shows part of a network infrastructure, represented by the first data, comprising two hosts 601, 602, the first having one software vulnerability (indicated by the shaded box) and the second having two software vulnerabilities according to some embodiments. For example, the software vulnerability may be an out-of-date version of the software, for which a patch is available. The prioritization rules 212 may determine that the greater the number of downstream services or hosts that take data from an affected host indicates a more critical computer requiring patching. Accordingly, the first host 601 may be displayed and/or patched in favour of the second host 602. Note that a different network with a different infrastructure may produce a different result.

For example, another set of prioritization rules may prioritize presentation and/or patch deployment based on the type or role of an affected host. For example, with reference to FIG. 6B, the first data may indicate that the second host 602 is associated with control of a critical industrial system or machine 604, whereas the first host 601 is perhaps associated with some administration function, e.g., a human resources part of the network domain. The prioritization rules may determine therefore that, despite the first host 60i having a greater number of downstream services or hosts, as in the FIG. 6A case, the second host 602 takes precedence because of its role in the context of the particular network. Accordingly, the second host 602 may be displayed and/or patched in favour of the first host 601. Note that a different network with a different infrastructure may produce a different result. Other examples of critical hosts include domain controllers, application servers and so on. Examples of non-critical hosts may comprise ordinary PCs and/or mobile terminals.

For example, another set of prioritization rules may prioritize presentation and/or patch deployment based on the type or role of users of an affected host. For example, with reference to FIG. 6C, the first data may indicate that the second host 602 is associated with users including the managing director of the organization, or a group of users relatively high up in the management chain, whereas the first host 601 is perhaps associated with a human resources part of the network domain. The prioritization rules may determine therefore that, despite the first host 601 having a greater number of downstream services or hosts, as in the FIG. 6A case, the second host 602 takes precedence because of the role of its users in the context of the particular network. Accordingly, the second host 602 may be displayed and/or patched in favour of the first host 601. Note that a different network with a different infrastructure may produce a different result.

Figure 6D:
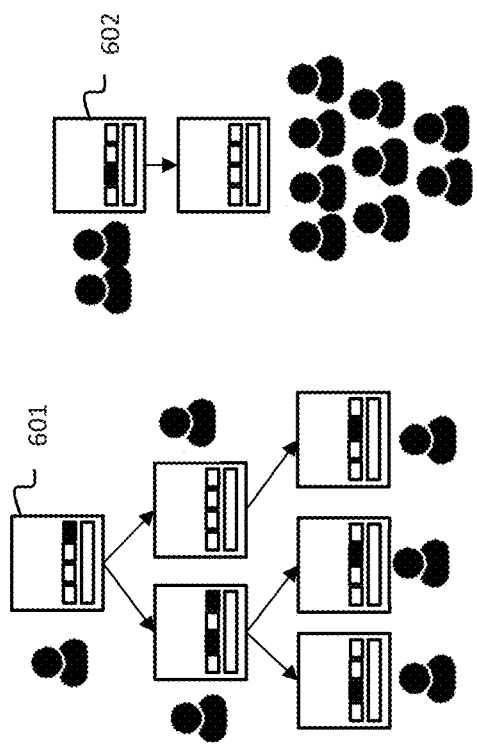

For example, another set of prioritization rules may prioritize presentation and/or patch deployment based on the number of users. For example, with reference to FIG. 6D, the first data may indicate that the second host 602 is associated with more users than the first host 601, despite the larger number of vulnerabilities associated with the first host 602 and its associated domain. The prioritization rules may determine therefore that, despite the first host 601 domain having a greater number of downstream services or hosts or vulnerabilities, the second host 602 takes precedence because of the number of users. Accordingly, the second host 602 may be displayed and/or patched in favour of the first host 601. Note that a different network with a different infrastructure may produce a different result.

In some examples, the above prioritization rules may be combined or modified. Users may tailor the rules based on their own preferences and may switch between different sets of rules via the user interface based on current requirements.

In certain examples, the prioritization rules enable administrators or users associated with particular networks to tailor how hosts and/or detected vulnerabilities are presented or arranged on the user interface and/or to determine how patches are to be deployed.

In some embodiments, for example, an efficient patch deployment strategy may be determined based on the least number of patches to deploy to remedy the most number of vulnerabilities.

For example, the prioritization rules may identify the N most critical hosts or software application that require patching, using one or more of the above examples. The prioritization rules may then determine the least number of patches needing deployment to remedy these N most critical hosts, and configure the VMS 12, 120 to deploy these first or to recommend their deployment in a report. For example, the least number of patches may be compressed into a single file and as a result may be deployed in an efficient and prioritized manner to patch a relatively significant number of vulnerabilities that may offer most benefit to the network.

Figure 7:
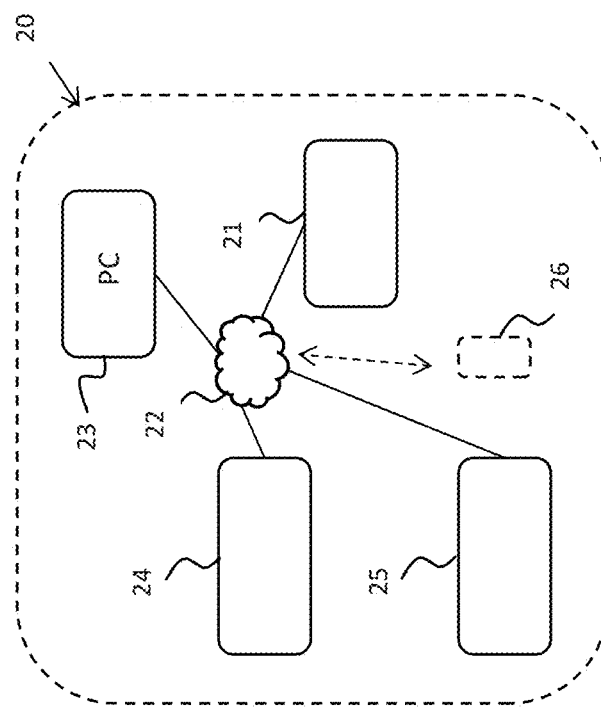
FIG. 7 is a schematic view of an organisational computer network for understanding how the vulnerability management system may identify and remedy blind spot vulnerabilities according to some embodiments.

In some embodiments, inferences may also be made by the VMS 12, 120 based on the first and second data. For example, it is known for so-called blind spots to exist in the network infrastructure at times when the vulnerability scanner runs its scan. According to some embodiments, referring to FIG. 7, this may occur for example if a host, e.g., the mobile host 26 leaves the network temporarily and/or if login privileges or other security functions do not permit the vulnerability scanner to reach a particular host or group of hosts. The second data will therefore not detect any vulnerability existing in said blind-spot. In this situation, because the first data comprises data indicating the host and software inventory of the network infrastructure, the existence of said host and its associated software is nevertheless known. Therefore, if another host has the same software, e.g., a particular operating system or application of the same version, and that software has a vulnerability as determined by the scanning software, then it can be inferred that all other hosts with the same software will have that vulnerability. This knowledge can be used to indicate the same in the output data, on the user interface and/or to incorporate into the patch deployment strategy. In some examples, therefore, regardless of whether an affected host is on the network at the time of scanning, the vulnerabilities will be reflected in the combined output data and a patching strategy will take into account the need to provide the patch at the appropriate time, i.e., when the affected host next appears or at the next general patching deployment.

In certain examples, the output data may be updated over time to reflect what patches are in progress for which hosts and/or software, and which have been remedies, so that the last patch applied to the host and/or software is indicated.

In some embodiments, a method is performed by one or more processors. The method includes: receiving first data representing an infrastructure of a computer network, the first data comprising an indication of hosts which form at least part of the computer network and one or more software resources on respective hosts; receiving second data from a vulnerability scanning software, the second data comprising an indication of one or more vulnerabilities detected in the one or more software resources provided on at least some of the hosts of the computer network; and generating, using a combination of the first data and the second data, output data representing a risk profile of the computer network infrastructure, the output data indicating one or more subsets of hosts, determined as being at risk of being affected by the detected vulnerabilities by virtue of the software resources they provide for output on a user interface.

In certain embodiments, a computer program, optionally stored on a non-transitory computer readable medium program which, when executed by one or more processors of a data processing apparatus, causes the data processing apparatus to perform: receiving first data representing an infrastructure of a computer network, the first data comprising an indication of hosts which form at least part of the computer network and one or more software resources on respective hosts; receiving second data from a vulnerability scanning software, the second data comprising an indication of one or more vulnerabilities detected in the one or more software resources provided on at least some of the hosts of the computer network; and generating, using a combination of the first data and the second data, output data representing a risk profile of the computer network infrastructure, the output data indicating one or more subsets of hosts, determined as being at risk of being affected by the detected vulnerabilities by virtue of the software resources they provide for output on a user interface.

According to some embodiments, an apparatus includes one or more processors, and a memory storing instructions. The instructions, when executed by the one or more processors, causing the apparatus to perform: receiving first data representing an infrastructure of a computer network, the first data comprising an indication of hosts which form at least part of the computer network and one or more software resources on respective hosts; receiving second data from a vulnerability scanning software, the second data comprising an indication of one or more vulnerabilities detected in the one or more software resources provided on at least some of the hosts of the computer network; and generating, using a combination of the first data and the second data, output data representing a risk profile of the computer network infrastructure, the output data indicating one or more subsets of hosts, determined as being at risk of being affected by the detected vulnerabilities by virtue of the software resources they provide for output on a user interface.

According to some examples, each of the processes, methods, and algorithms described in the preceding sections may be embodied in, and fully or partially automated by, code modules executed by one or more computer systems and/or computer processors comprising computer hardware. The processes and algorithms may be implemented partially or wholly in application-specific circuitry.

According to certain examples, the various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

In some examples, conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

In certain examples, any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A method, performed by one or more processors, the method comprising:
    receiving first data representing an infrastructure of a computer network, the first data comprising an indication of hosts which form at least part of the computer network and one or more software resources on respective hosts;
    receiving second data from a vulnerability scanning software, the second data comprising an indication of one or more vulnerabilities detected in the one or more software resources provided on at least some of the hosts of the computer network;

generating, using a combination of the first data and the second data, output data representing a risk profile of the computer network infrastructure, the output data indicating one or more subsets of hosts, determined as being at risk of being affected by the detected vulnerabilities by virtue of the software resources they provide for output on a user interface; and determining a patch deployment strategy based on one or more prioritization rules, performance of which is dependent on the infrastructure of the computer network, the one or more prioritization rules determining an order of one or more patches to deploy to remedy the detected vulnerabilities, the order indicating first deploying patches to remedy a number N of most-critical hosts or software resources that require patching, wherein the deployment strategy determines a least number of patches to deploy to remedy all of the N most-critical hosts or software resources.

2. The method of claim 1, further comprising determining a number of downstream hosts that take data from the one or more subsets of hosts and indicating said number of downstream hosts in the output data.

3. The method of claim 1, further comprising:
determining the one or more patches for remedying the detected vulnerabilities; and
presenting the output data on the user interface with an indication of the determined one or more patches on the user interface, the one or more patches being deployable through the user interface.

4. The method of claim 3, wherein each of the one or more subsets of hosts or vulnerabilities represented by the output data are arranged on the user interface based on one or more prioritization rules, performance of which is dependent on the infrastructure of the computer network.

5. The method of claim 4, wherein the prioritization rules determine the arrangement based on how critical one of the subset of hosts is to the infrastructure of the computer network.

6. The method of claim 5, wherein the first data comprises an indication of a type or role for each host, and wherein how critical one of the subset of hosts is to the computer network is determined based on their respective type or role.

7. The method of claim 5, wherein how critical one of the subset of hosts is to the computer network is determined based on the number of hosts that take data from at-risk hosts, those with a greater number of downstream hosts being arranged so as to indicate a higher priority.

8. The method of claim 5, further comprising receiving third data indicative of users or groups of users associated with particular hosts, and wherein the output data further comprises a list of one or more users associated with the subsets of hosts and wherein how critical one of the subset of hosts is to the computer network is based on the role of the users, or groups of users, associated with said subset of hosts.

9. The method of claim 5, further comprising receiving third data indicative of users or groups of users associated with particular hosts, and wherein the output data further comprises a list of one or more users associated with the one or more subsets of hosts and wherein how critical one of the subset of hosts is to the computer network is based on a number of users associated with said subset of hosts.

10. The method of claim 1, further comprising deploying patches using the determined patch deployment strategy.

11. The method of claim 1, further comprising automatically generating an electronic report representing the patch deployment strategy for electronic transmission to a remote organization with an indication of the determined patch deployment strategy.

12. The method of claim 11, wherein the electronic report comprises one or more embedded links for user-selection to deploy the one or more patches.

13. The method of claim 1, further comprising automatically requesting deployment of the one or more patches according to the patch deployment strategy.

14. The method of claim 1, further comprising using the first data and the second data to automatically infer one or more vulnerabilities on one or more hosts of the computer network infrastructure which, in a previous scanning iteration, were not scanned by the vulnerability scanning software, the inferring comprising identifying from the first data and the second data a detected vulnerability in a particular software resource and using the first data to identify non-scanned hosts providing the particular software resource, said inferred one or more hosts being indicated in the output data.

15. The method of claim 1, wherein the determined least number of patches may be compressed into a single file for subsequent deployment.

16. The method of claim 1, further comprising automatically generating an electronic report representing the patch deployment strategy for electronic transmission to a remote organization with an indication of the determined patch deployment strategy, wherein the electronic report may comprise one or more embedded links for user-selection to deploy the patches.

17. A computer program, optionally stored on a non-transitory computer readable medium program which, when executed by one or more processors of a data processing apparatus, causes the data processing apparatus to perform:
receiving first data representing an infrastructure of a computer network, the first data comprising an indication of hosts which form at least part of the computer network and one or more software resources on respective hosts;
receiving second data from a vulnerability scanning software, the second data comprising an indication of one or more vulnerabilities detected in the one or more software resources provided on at least some of the hosts of the computer network;
generating, using a combination of the first data and the second data, output data representing a risk profile of the computer network infrastructure, the output data indicating one or more subsets of hosts, determined as being at risk of being affected by the detected vulnerabilities by virtue of the software resources they provide for output on a user interface; and
determining a patch deployment strategy based on one or more prioritization rules, performance of which is dependent on the infrastructure of the computer network, the one or more prioritization rules determining an order of one or more patches to deploy to remedy the detected vulnerabilities, the order indicating first deploying patches to remedy a number N of most-critical hosts or software resources that require patching, wherein the deployment strategy determines a least number of patches to deploy to remedy all of the N most-critical hosts or software resources.

18. An apparatus comprising:
one or more processors; and
a memory storing instructions, the instructions, when executed by the one or more processors, causing the apparatus to perform:

receiving first data representing an infrastructure of a computer network, the first data comprising an indication of hosts which form at least part of the computer network and one or more software resources on respective hosts;

receiving second data from a vulnerability scanning software, the second data comprising an indication of one or more vulnerabilities detected in the one or more software resources provided on at least some of the hosts of the computer network;

generating, using a combination of the first data and the second data, output data representing a risk profile of the computer network infrastructure, the output data indicating one or more subsets of hosts, determined as being at risk of being affected by the detected vulnerabilities by virtue of the software resources they provide for output on a user interface; and determining a patch deployment strategy based on one or more prioritization rules, performance of which is dependent on the infrastructure of the computer network, the one or more prioritization rules determining an order of one or more patches to deploy to remedy the detected vulnerabilities, the order indicating first deploying patches to remedy a number N of most-critical hosts or software resources that require patching, wherein the deployment strategy determines a least number of patches to deploy to remedy all of the N most-critical hosts or software resources.

19. The apparatus of claim 18, wherein the instructions further cause the apparatus to perform:

automatically generating an electronic report representing the patch deployment strategy for electronic transmission to a remote organization with an indication of the determined patch deployment strategy, wherein the electronic report may comprise one or more embedded links for user-selection to deploy the patches.

* * * * *